Patented Aug. 16, 1932

1,872,026

UNITED STATES PATENT OFFICE

CHARLES A. CAREY, OF ARLINGTON, MASSACHUSETTS, ASSIGNOR TO DEWEY AND ALMY CHEMICAL COMPANY, OF CAMBRIDGE, MASSACHUSETTS, A CORPORATION OF MASSACHUSETTS

SODA-LIME AND METHOD OF PREPARING SAME

No Drawing.   Application filed December 22, 1930. Serial No. 504,224.

This invention relates to soda-lime and provides a method of making the same in an improved form for use as an absorbent.

Soda-lime, which consists essentially of slaked lime and caustic soda, in admixture, is widely used as an absorbent in the treatment of gaseous materials, such as the atmosphere when polluted with carbon dioxide and the like.

As at present prepared for such purposes, the material has been obtained in the form of a relatively solid cake or slab which is broken up and screened to produce the desired sizes of granules. The finer sizes and dust, amounting to about 40% of the material, constitute a waste product. Moreover, the granular product obtained in this manner is relatively weak and friable so that it is readily reduced in size upon handling and during storage and use. This may be offset to some extent by compacting the originally prepared material, but such treatment also increases the density and thus decreases the porosity and effective absorptiveness of the material. The addition of bonding agents produces a like result.

An object of this invention, accordingly, is to prepare soda-lime in a granular form, in which the individual granules shall possess and retain a highly permeable and absorbent structure, shall naturally assume an open arrangement, be sufficiently strong to retain such arrangement, and resist crushing and crumbling during the ordinary attrition caused by handling, storage and use. It is also an object to prepare such a product from inexpensive raw materials, by a simple treatment and without the concurrent production of a large proportion of fines.

Other objects will appear from the following disclosure.

The method of the invention presupposes the preliminary formation of the reagent materials (which may consist of waste soda-lime fines from previous processes or slaked lime and caustic soda, or of all these materials) in a finely divided dry condition. The material is loosely agitated in the presence of moisture, which is introduced in the form of a finely divided mist, or as water vapor,—with or without the addition of one or more of the other materials in the form of finely divided dust or water solution. The average sizes of the solid particles thereupon increases, by accretion, substantially without increase of density but with a marked increase in resistance to impact and attrition. The more rapid the agitation, as for example by rotation in a tumbling barrel,—the more rapid the growth in particle sizes; whereas with slower agitation the growth in particle size may be less rapid but the increase in hardness or strength of the individual granules is more marked.

The expression "dry" is not used herein in the literal sense of absolute freedom from moisture but in the sense of common usage to define that range of moisture content within which the material so qualified is not palpably wet.

Example I

For example, soda-lime fines and dust may be charged into a rotatable drum in convenient amount to permit free agitation and the drum rotated at a speed of approximately 50 R. P. M. Moisture is added carefully in the condition of a fine mist or spray preferably finely dispersed and uniformly distributed throughout the charge. The total amount of moisture added may vary, but it is found that best results are usually obtained with approximately 25 to 27% of water upon the weight of the charge. After agitating for about 45 minutes, it is found that the fines and dust have agglomerated into larger particles which are substantially spheroidal, and that relatively few are sufficiently small to pass through a ten mesh screen.

The charge may then be withdrawn, spread out upon trays or the like and dried in any convenient way to yield a product having a moisture content of 10 to 20%, depending upon the use for which it is intended. It may then be packed, stored, and used, as required.

If the time of treatment be prolonged and the rate of rotation of the drum reduced, e. g. to an hour and a half at 25 R. P. M.—the spheroidal particles are somewhat stronger, but the density also is found to be increased, yielding a somewhat less permeable granule. In either case, however, the granules are generally spheroidal in shape and at the same time present a convoluted surface, especially adapted to induce a loose packing arrangement, en masse, and one which resists the pulverizing effects of attrition and shocks from jarring, handling, storage, etc. At the same time the individual granules are porous or permeable and consequently present an extensive surface, effective for absorption.

Example II

For the production of more regularly spherical granules, approximately 75 parts of soda-lime fines and dust may be charged into the drum, and agitated at 50 R. P. M. for 45 minutes, with the addition of approximately 25 parts of water, as above described. To the resulting granules may then be added, gradually and with continued agitation (at 25 to 30 R. P. M.) approximately 25 parts of dry, finely divided slaked lime. The rotation of the drum being continued, at about 25 R. P. M., a caustic soda solution (e. g. 20% NaOH) is sprayed into the drum in the form of a fine mist, in an ultimate amount corresponding to the desired NaOH/Ca(OH)$_2$ ratio. The charge is then withdrawn and dried.

It is found that the granules thus obtained are rounder, or more nearly spherical than those above described and have a higher resistance to mechanical abuse without decrease in absorptive efficiency. Microscopic examination of these particles discloses a porous center, composed of small aggregated particles, surrounded by a denser layer of varying thickness.

Example III

In the preparation of the product from slaked lime and caustic soda, the dry, powdered slaked lime may be charged into the drum which is then revolved, preferably at the higher rate above indicated,—e. g. 50 R. P. M. A solution of caustic soda (e. g. 20% NaOH) is then introduced in the form of a fine mist and uniformly distributed throughout the charge. This may be added to produce a total moisture content of about 25%. If a higher NaOH/Ca(OH)$_2$ ratio is desired a more concentrated caustic soda solution may be employed. It is also convenient, to adjust the concentration so that two-thirds of the water added may be in the form of caustic soda solution followed by one-third, as water only, with which to finish the treatment.

The agitation may be started at the highest speed and finished at the lowest speed, as in Example II, for increasing the soundness of the particles as well as their resistance.

Example IV

For special purposes, granules which have been prepared according to Examples I or II may be treated with finely divided Portland cement, aluminum hydrate or kieselguhr, up to an amount of 10 to 15% by weight, which greatly strengthens the granules without appreciable reduction in absorption efficiency.

It should be understood that the present disclosure is for the purpose of illustration only and that this invention includes all modifications and equivalents which fall within the scope of the appended claims.

I claim:

1. Method of making granular soda-lime, comprising as steps agitating a charge of dry soda-lime fines and dust and introducing water thereto in the form of a fine mist in an ultimate amount of approximately 25% by weight.

2. Method of making granular soda-lime, comprising as steps agitating a charge of dry soda-lime fines and dust and introducing water thereto in the form of a fine mist followed by the addition of finely divided slaked lime and finally a spray of caustic soda solution.

3. Method of making granular soda-lime, comprising as steps agitating a charge of dry soda-lime fines and dust and introducing water thereto in the form of a fine mist, followed by the addition of finely divided slaked lime with decreased rate of agitation, and finally a spray of caustic soda solution.

4. Method of making granular soda-lime comprising as steps tumbling a charge of dry soda-lime fines and dust, introducing water thereto in the form of a fine mist, and reducing the rate of tumbling toward the end of the treatment.

5. Method of making granular soda-lime, comprising as steps agitating dry slaked lime, introducing a solution of caustic soda thereto, in the form of a fine mist and uniformly distributed throughout the charge.

6. Method of making granular soda-lime, comprising as steps agitating dry slaked lime, introducing a solution of caustic soda thereto, in the form of a fine mist, and uniformly distributed throughout the charge, and finally treating with a spray of water.

7. Granules of soda-lime characterized by having a generally spherical shape and a convoluted surface.

8. Granules of soda-lime structurally characterized by having a porous center of small aggregated particles surrounded by a denser layer.

9. Method of making granular soda lime, comprising as steps agitating a charge of dry soda lime fines and dust and introducing water thereto in the form of a fine mist in an ultimate amount of approximately 25% by weight and thereafter evaporating water therefrom until the moisture content is between 10 and 20% by weight.

10. Granules of soda lime characterized by having a generally spherical shape and convoluted surface and a moisture content of from 10 to 20%.

Signed by me at Cambridge, Mass., this eighteenth day of December, 1930.

CHARLES A. CAREY.